United States Patent Office 2,900,228
Patented Aug. 18, 1959

2,900,228

SELECTIVE SEPARATION OF URANIUM FROM THORIUM, PROTACTINIUM AND FISSION PRODUCTS BY PEROXIDE DISSOLUTION METHOD

Glenn T. Seaborg, Chicago, Ill., John W. Gofman, Berkeley, Calif., and Raymond W. Stoughton, Oak Ridge, Tenn., assignors to the United States of America as represented by the United States Atomic Energy Commission No Drawing. Application November 3, 1944
Serial No. 561,836

7 Claims. (Cl. 23—14.5)

The invention relates to the separation of the isotope of uranium having a mass number of 233 from foreign products, and more particularly relates to the separation of such isotope (designated herein as $U^{233}$) from thorium and fission products present in neutron-irradiated thorium.

It is an object of this invention to provide a method of preparing and recovering $U^{233}$ in substantial concentration and further to provide certain novel and useful compounds of $U^{233}$ and $Pa^{233}$.

Other objects and advantages of this invention will become apparent from the accompanying description of the invention.

In this specification and claims the name of the element is used to designate the element generically, either in its elemental state or combined in a compound unless otherwise indicated by the sense in which it is used or by a specific designation such as "metal" or "elemental."

It is known that the bombardment of thorium with fast neutrons of energies above about 2 million electron volts (2 m.e.v.) results in a fission of the thorium.

We have discovered that the bombardment of thorium with neutrons having energies of below 1 million electron volts (1 m.e.v.) results not only in the production of $Pa^{233}$ and ultimately of $U^{233}$ through the prolonged decay of $Pa^{233}$ and further that $U^{233}$ would undergo fission with neutrons of such low energies as below 1 million electron volts (1 m.e.v.) and even with thermal neutrons. The production of $U^{233}$ is thus complicated by the fact that the $U^{233}$ produced by neutron bombardment may be decomposed by the same bombardment. In accordance with the present invention $U^{233}$ in recoverable concentration may be secured while minimizing the formation of such fission products by proper control of the degree of bombardment. Further we have provided an effective means for recovery of the $U^{233}$ produced from the unconverted thorium and fission products.

The reaction of thorium with slow and moderately fast neutrons may be summarized as follows:

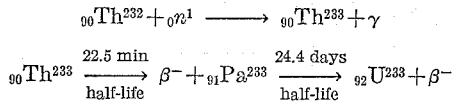

The fission products which are produced as a result of the fission of $U^{233}$ with slow and moderately fast neutrons are, so far as we have been able to determine, the same as those produced by the fission of $U^{235}$. They consist of a large number of elements which generally fall into a light group with atomic numbers from 35 to 46 incl. and a heavy group with atomic numbers from 51 to 60 incl. and which undergo beta decay. The fission products which have a half-life of more than three days will remain in the reaction mass in substantial quantities at least one month after the termination of the reaction, and the removal or elimination of these products by our process is particularly advantageous. Among these products are: Sr, Y, Zr, Cb, Ru, Te, I, Xe, Cs, Ba, La, and Ce of a 20-day half-life, and Ce of a 200-day half-life.

In accordance with one embodiment of this invention, a mass of thorium, either metallic thorium or a compound of thorium, such as the oxide, hydrate or carbonate is subjected to the action of neutrons, the majority of which have energies below 1 million electron volts, the reaction of the neutrons with the thorium is terminated prior to the time when the neutrons are absorbed by the $U^{233}$ at the same rate that they are absorbed by the $Th^{232}$. This limit is approximately achieved when the weight ratio of $U^{233}$ to unreacted $Th^{232}$ is 1 to 100. In other words, the reaction of $Th^{232}$ with neutrons should preferably be terminated prior to when the amount of $U^{233}$ is approximately 1 percent of the amount of thorium present in the mass. When the reaction is terminated at or prior to this point there is also no danger during the reaction of a substantial decomposition of the $U^{233}$ taking place by a nuclear self-sustaining chain reaction.

It is generally desirable to terminate the reaction of the neutrons with $Th^{232}$ when the amount of $U^{233}$ is much less than 1 percent of the unreacted amount of $Th^{232}$ in order to reduce the amount of fission products and make it possible to isolate the $U^{233}$ by ordinary chemical means without the use of large quantities of special materials such as refrigerating devices, radiation shields, special radiation-resistant materials and the like. In order to reduce such special equipment to a minimum and at the same time have a practical amount of $U^{233}$ and $Pa^{233}$ for isolation by batch process, the reaction is terminated at a ratio of $U^{233}+Pa^{233}$ to $Th^{232}$ of not less than about 1 to 1 million and frequently between about 1 to 10,000, and 1 to 1,000.

In order to ensure production of $U^{233}$ in a form such as to be recoverable in a concentrated state, the thorium subjected to treatment preferably is substantially free or contains but negligible amounts of natural uranium. In any case the amount of natural uranium present should not be in excess of 20 percent by weight of the $U^{233}$ produced and production of $U^{233}$ sohuld be continued until at least 80 percent by weight of the total uranium content is $U^{233}$. Generally speaking the natural uranium content should not exceed about one part by weight per million parts by weight of thorium and preferably should be no more than one part in ten million parts of thorium.

The reaction of thorimum with neutrons to produce $Pa^{233}$ and $U^{233}$ may be carried out with neutrons from any suitable neutron source. Where the neutron source provides fast neutrons of above 1 million electron volts the fast neutrons are slowed to neutrons having energies of below 1 million electron volts by interposing neutron-slowing material between the fast neutrons and the thorium. Such neutron-slowing materials include carbon-containing, deuterium-containing, or hydrogen-containing material, for example, graphite, paraffin, and heavy water. Sufficient neutron-slowing material is used so that at least a majority of the neutrons are slowed to energies of below about 1 million electron volts, since at higher energies there is less production of $U^{233}$ and considerable fission of the thorium. We may interpose the neutron-slowing material between the fast neutrons and the thorium-containing mass, or we may admix neutron-slowing material with the thorium. An intimate mixture of thorimum with neutron-slowing material may be readily obtained by using hydrated thorium compounds, such as $Th(OH)_4 \cdot XH_2O$. Since the slow-neutron-absorption cross section of thorium is some 10 to 40 times larger than that of hydrogen, we may suitably use a ratio as high as about two to four hydrogen atoms per thorium atom without losing any more than about 10 percent of the neutrons as a result of absorption by hydrogen.

While neutrons obtained from any suitable neutron source may be used, it is desirable to subject the thorium to neutrons from a high intensity source in order that suitable concentrations of $Pa^{233}$ and $U^{233}$ may be obtained in a reasonable length of time.

The thorium is subjected to neutrons from a source of neutrons capable of supplying more than $10^{15}$ neutrons per second and preferably at least $5 \times 10^{17}$ neutrons per second to the thorium and in order to secure a relatively high concentration of the $U^{233} + Pa^{233}$ a mass of thorium weighing no more than about 20 tons should be used. This body of thorium should be sufficiently thick to absorb at least 50 percent and preferably 75 percent or more of the neutrons so supplied. Such high neutron intensity may be obtained by subjecting thorium to the action of neutrons obtained by slowing down secondary neutrons obtained from a self-sustaining chain reaction of $U^{233}$, $U^{235}$ or $94^{239}$ with neutrons.

By placing the thorium adjacent to a neutron chain-reacting mass comprising uranium and/or $94^{239}$ in amount sufficient to establish a self-sustaining chain neutron reaction dispersed in a neutron-slowing means such as carbon or $D_2O$, neutron intensities of between $5 \times 10^{17}$ and $10^{20}$ neutrons per second may be supplied to the thorium, and when at least 50 to 75 percent of such neutrons are absorbed by the thorium, a ratio of $U^{233} + Pa^{233}$ to $Th^{232}$ of more than 1 to 1 million may be attained in a reasonable length of time, such as one to three months. In such a case the desired degree of bombardment may be completed before the preponderant amount of $Pa^{233}$ formed has decayed to form $U^{233}$.

The product obtained by bombarding thorium comprises a preponderant quantity of thorium, a small quantity of $U^{233}$ and a smaller amount of fission products. Where the product is not of substantial age, it also contains an appreciable quantity of $Pa^{233}$; but the amount thereof gradually decreases by decay to $U^{233}$. Where recovery of a maximum of $U^{233}$ is desired, the product is permitted to age until much of the $Pa^{233}$ has decayed, for example for one or more months. Where bombardment of the thorium has proceeded over a period of several weeks, an adequate quantity of $U^{233}$ may be secured due to decay during the bombardment and further delay to increase the yield may be unnecessary.

We have found that the $U^{233}$ may be recovered by means of a soluble peroxide such as $H_2O_2$, $Na_2O_2$, etc. The neutron-irradiated thorium containing the $U^{233}$ is dissolved in acid, such as an aqueous solution of nitric or hydrochloric acid. It is important that there be present before the precipitation of the thorium and uranium from the solution some oxidizing agent, such as nitric acid, so as to be sure that the uranium is in the uranyl form. After the adjustment of the acidity of the solution to a pH of about 3, the thorium and uranium are precipitated together as peroxides by the addition of hydrogen peroxide in amount in substantial excess of that required to form the corresponding thorium and uranium peroxides. After the removal of the supernatant liquid, the peroxide precipitate is leached or extracted with a suitable alkali-water solution such as an aqueous solution of sodium hydroxide, potassium hydroxide, sodium peroxide or other alkaline agent capable of extracting the uranium as a peruranate and/or uranate. Uranium peroxide dissolves readily in sodium hydroxide or equivalent solution, while thorium peroxide is insoluble, so that a separation of the $U^{233}$ from the thorium is effected by this operation. The uranium may then be separated from this alkaline solution by reprecipitation as a peroxide by suitable means, for example by acidifying with an acid such as nitric or hydrochloric acid, so as to precipitate uranium peroxide. The fission products may be substantially completely separated from the $U^{233}$ by dissolving the precipitate with nitric acid at a pH of, for example, about 1 and precipitating the $U^{233}$ as the peroxide with an excess of hydrogen peroxide, the dissolving and precipitation being repeated several times. Another procedure is to dissolve the precipitate containing uranium peroxide and fission products in nitric acid, crystallize out the uranyl nitrate hexahydrate by usual crystallization methods, and then dissolve this compound in ether, the fission products not dissolving in ether.

Although the $Pa^{233}$ decays to $U^{233}$ and, therefore, it may not be necessary to separate the $Pa^{233}$ from the $U^{233}$ in all cases, the above peroxide method does separate these two isotopes from each other since the $Pa^{233}$ comes down with the peroxide precipitate and is not redissolved with the $U^{233}$ by the sodium hydroxide.

A cyclic process may be effected instead of the above described batch process for separating uranium from thorium and fission products. Thorium peroxide may be used as the neutron-absorbing medium, and after treatment with sodium hydroxide and sodium peroxide solutions so as to extract the $U^{233}$, the thorium peroxide will be ready for use again.

By the above methods of separating $U^{233}$ from foreign products we are able to obtain compositions composed largely or entirely of $U^{233}$ compounds, which are substantially free from fission products. The $U^{233}$ metal may be produced from suitable compounds thereof by sodium reduction or any of the other known methods for producing uranium metal from compounds of uranium.

$U^{233}$ metal or compounds of $U^{233}$ may be shaped into the form of spheres, cylinders, blocks or the like by known methods of shaping uranium metal and compounds. Such shaped articles of manufacture may be used as a source of nuclear power as described in our copending application, Serial No. 565,990, filed November 30, 1944.

While there have been described certain embodiments of our invention, it is to be understood that it is capable of many modifications. Changes, therefore, may be made without departing from the spirit and scope of the invention as described in the appended claims, in which it is the intention to claim all novelty in the invention as broadly as possible.

We claim:

1. The method of separating $U^{233}$ from foreign products present in neutron irradiated thorium, which method comprises forming a solution of said neutron irradiated thorium, precipitating the uranium and thorium with a soluble peroxide, treating the peroxide precipitate with sodium hydroxide to selectively dissolve the uranium peroxide, and recovering $U^{233}$ from the resulting solution.

2. The method of separating $U^{233}$ from thorium, fission products, and protoactinium present in neutron irradiated thorium, which method comprises forming a solution of said neutron irradiated thorium having a pH of about 3, adding hydrogen peroxide to obtain a precipitate comprising uranium and thorium, treating the precipitate with sodium hydroxide to selectively dissolve the uranium, separating the dissolved uranium from the thorium, and lowering the alkalinity of the solution of said uranium to obtain a precipitate containing $U^{233}$.

3. The method of separating $U^{233}$ from thorium, fission products, and protoactinium present in neutron irradiated thorium, which method comprises forming a solution of said neutron irradiated thorium having a pH of about 3, adding hydrogen peroxide to obtain a precipitate comprising uranium and thorium, treating the precipitate with sodium hydroxide to selectively dissolve the uranium, separating the dissolved uranium from the thorium, and acidifying the solution to obtain a precipitate of $U^{233}$ peroxide.

4. A method of recovering $U^{233}$ which comprises forming an aqueous solution of neutron irradiated thorium containing $U^{233}$ precipitating $U^{233}$ and thorium as peroxides and selectively extracting the uranium from the precipitate by means of an aqueous alkaline solution.

5. A method which comprises irradiating thorium peroxide with neutrons to form $Pa^{233}$ which is capable of decay to $U^{233}$, extracting the $Pa^{233}$ and $U^{233}$ from the thorium peroxide by means of an aqueous alkali solution and radiating the remaining thorium peroxide with neutrons.

6. The method of separating uranium values from thorium values, which method comprises forming a solution of said thorium and uranium values, precipitating the uranium and thorium values with a soluble peroxide, treating the peroxide precipitate with an aqueous sodium hydroxide solution to selectively dissolve the uranium peroxide and recovering uranium values from the resulting solution.

7. A method of separating uranium values from a mixture of thorium, uranium and protactinium values, which method comprises forming a solution of said mixture having a pH of about 3, adding hydrogen peroxide to obtain a precipitate comprising uranium and thorium values, treating the precipitate with sodium hydroxide to selectively dissolve the uranium values, separating the dissolved uranium values from thorium values, and lowering the alkalinity of the solution of said uranium values to obtain a precipitate containing uranium values.

References Cited in the file of this patent

Friend: "Textbook of Inorganic Chemistry," vol. VII, part III, p. 311 (1926); published by Charles Griffin & Co., Ltd., London.

Rosenheim et al.: "Chemical Abstracts," vol. 23, p. 4634 (1929).

Meitner et al.: "Chemical Abstracts," vol. 32, p. 7815 (1938).

Hopkins: "Chapters in the Chemistry of the Less Familiar Elements," vol. II, chapter 18, "Uranium," pp. 7, 14; Stripes Publishing Co., Champaign, Ill. (1939).

Hahn et al.: "Chemical Abstracts," vol. 36, p. 6893 (1942).